United States Patent
Andress et al.

(10) Patent No.: US 6,599,342 B2
(45) Date of Patent: Jul. 29, 2003

(54) FILTER CARTRIDGE

(75) Inventors: Heinz Andress, Erdmannhausen (DE); Helmut Luka, Marbach (DE); Bertram Uebelhoer, Waiblingen (DE); Gerhard Mayer, Pleidelsheim (DE); Werner Blossey, Benningen (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/032,504

(22) Filed: Jan. 2, 2002

(65) Prior Publication Data

US 2002/0112459 A1 Aug. 22, 2002

Related U.S. Application Data

(63) Continuation of application No. PCT/EP00/05373, filed on Jun. 10, 2000.

(30) Foreign Application Priority Data

Jul. 2, 1999 (DE) .......................... 199 30 614

(51) Int. Cl.⁷ .............................. B01D 46/00
(52) U.S. Cl. .................. 55/495; 55/337; 55/385.3; 55/498; 55/502; 55/510; 55/521; 55/528; 123/198 E
(58) Field of Search ................. 55/495, 498, 499, 55/500, 502, 503, 507, 510, 385.3, 320, 337, 318, 521, 528; 123/198 E

(56) References Cited

U.S. PATENT DOCUMENTS

| | | | | |
|---|---|---|---|---|
| 5,167,683 A | * | 12/1992 | Behrendt et al. | 55/498 |
| 5,171,342 A | * | 12/1992 | Trefz | 55/498 |
| 5,413,712 A | * | 5/1995 | Gewiss et al. | 55/498 |
| 5,487,767 A | * | 1/1996 | Brown | 55/498 |
| 5,693,109 A | * | 12/1997 | Coulonvaux | 55/498 |
| 5,730,769 A | * | 3/1998 | Dungs et al. | 55/385.3 |
| 5,755,843 A | * | 5/1998 | Sundquist | 55/498 |
| 5,882,367 A | | 3/1999 | Morgan et al. | |
| 5,954,849 A | * | 9/1999 | Berkhoel et al. | 55/498 |

FOREIGN PATENT DOCUMENTS

| | | | | |
|---|---|---|---|---|
| DE | 3140128 | 6/1983 | | |
| EP | 0 664 389 A1 | * | 7/1995 | ........... B01D/46/24 |
| GB | 2 110 110 A | * | 6/1983 | ........... B01D/27/06 |
| WO | 95/19382 | 7/1995 | | |
| WO | WO 96/37277 | * | 11/1996 | ........... B01D/46/24 |
| WO | 00/01464 | 1/2000 | | |

* cited by examiner

Primary Examiner—Duane Smith
Assistant Examiner—Jason M. Greene
(74) Attorney, Agent, or Firm—Crowell & Moring LLP

(57) ABSTRACT

A filter cartridge (16), especially for installation in an air filter of an internal combustion engine having a housing (10) with an inlet (12) for untreated air and an outlet (13) for clean air, the filter cartridge preferably being made of a pleated filter medium, and being provided with sealing elements on end plates (18, 19) arranged at the axial end faces of the filter cartridge. A support body (17) is provided on the inner wall of the filter cartridge with support surfaces (23) for axially and radially positioning the filter cartridge. A seal element (26) extending axially along the support body is also provided in the area of the support body.

15 Claims, 2 Drawing Sheets

FILTER CARTRIDGE

CROSS REFERENCE TO RELATED APPLICATIONS

This application is a continuation of international patent application no. PCT/EP00/05373, filed Jun. 10, 2000, designating the United States of America, the entire disclosure of which is hereby incorporated herein by reference. Priority is claimed based on Federal Republic of Germany patent application no. DE 199 30 614.1, filed Jul. 2, 1999.

BACKGROUND OF THE INVENTION

The invention relates to a filter cartridge, in particular for the air filter of an internal combustion engine, in which the air filter has a housing for holding the filter cartridge with an inlet for untreated air and an outlet for clean air, in which the filter cartridge comprises a filter medium that preferably is folded in a zigzag shape (i.e., pleated) and is provided with sealing elements on end plates disposed at the axial end faces of the cartridge.

A filter cartridge of this type is known, for example, from published international patent application no. WO 95/19382. The filter cartridge is arranged in a housing that has an inlet for untreated air and an outlet for clean air. The filter cleans the intake air in an internal combustion engine. Since the filter cartridge is replaced at regular intervals, it must be manufactured as economically as possible. The filter cartridge must also be easy to remove and install, as well as assure a reliable seal between the region of untreated air and the region of clean air.

This known filter cartridge is clamped between two concentric surfaces of the filter housing. The clamping action also simultaneously creates a seal, which must be maintained during shock or vibration.

A disadvantage of this system is that each filter cartridge has certain linear tolerances. As a result, clamping the filter cartridge in the housing creates a clamping force that is greater or smaller, depending on the linear proportions. A clamping force that is too great causes deformation of the filter cartridge, whereas a clamping force that is too small creates sealing problems in the filter cartridge during vibration.

SUMMARY OF THE INVENTION

It is an object of the invention to provide an improved filter cartridge which avoids the aforementioned disadvantages.

Another object of the invention is to provide a filter cartridge which can compensate for dimensional tolerances.

A further object is to provide a filter cartridge which produces a reliable seal between an untreated air space and a clean or filtered air space.

These and other objects are achieved in accordance with the present invention by providing a filter cartridge for installation in an air filter having a housing for holding the filter cartridge with an inlet for untreated air and an outlet for filtered air; the filter cartridge comprising an annular filter medium, end plates on axial end faces of the annular filter medium, and seal elements on the end plates; wherein a support body is provided interiorly adjacent the filter medium, and the support body is provided with support surfaces for axial and radial positioning of the cartridge at the end of the filter cartridge that faces the clean air outlet of the housing when the cartridge is installed in the housing; and wherein the seal element on the end plate of the filter cartridge that faces the clean air outlet when the cartridge is installed in the housing extends along the support body and the support surfaces and rests against an annular support surface.

In accordance with a further aspect of the invention, the objects are achieved by providing a filter cartridge comprising a cylindrical air filter element comprised of an annular filter medium, a base plate, a deformable outlet end plate having an outlet for filtered air, and a support tube integrated into the filter cartridge, the support tube forming a friction-locked connection with the outlet end plate and having an elastic zone at the end of the support tube adjacent the friction-locked connection.

In yet another aspect of the invention, the objects are achieved by providing a filter assembly comprising a filter housing with an inlet for untreated air and an outlet for filtered air, and a substantially cylindrical filter cartridge arranged in the housing between the inlet and the outlet, wherein the filter cartridge is mounted on a connection piece at the filtered air outlet and has an internal support body provided with support surfaces adjacent the connection piece for axially and radially positioning the filter cartridge, and wherein a seal element is provided in the vicinity of the support surfaces for sealing the filter cartridge to the housing.

A significant advantage of the invention is that the function of mounting the filter cartridge in the housing is separated from the function of creating a reliable seal between the untreated air space and the clean air space. The filter cartridge is mounted or fixed by means of a support body having support surfaces, and a reliable seal is created between the untreated air space and the clean air space by a sealing element located in the vicinity of the support body. The support body is preferably a hollow cylindrical, perforated element made of an injection-molded synthetic resin material. Such an element can be manufactured with high precision, thus eliminating the need for tolerance compensation. Any linear tolerance of the filter cartridge, therefore, does not affect the sealing function of the sealing element.

According to one embodiment of the invention, the sealing element and the end plate of the filter cartridge are combined as a single part. Polyurethane foam is suited for this purpose on account of its high elasticity. A further advantage of using polyurethane foam is the ease of thermal disposal of the used filter cartridge by incineration.

In a further embodiment of the invention, the filter cartridge is directly or indirectly supported by the housing wall or by a lid, on the side opposite from the clean air connection piece. Additional support elements or means of attachment, therefore, are not necessary.

A further embodiment of the invention involves pre-separation of dust particles. An axial cyclone is arranged in the region of the untreated air inlet so as to impart a swirling flow to the inflowing untreated air, causing coarse contaminant particles to precipitate on the inner wall of the housing. The particles may be removed via a discharge valve, for example.

In another aspect, the invention relates to a filter housing for a substantially cylindrical filter cartridge, the filter housing having an inlet for untreated air and an outlet for clean air. The filter housing is provided with a connection piece in the region of the clean air outlet. A filter cartridge is affixed to the connection piece by means of an internal support body that has support surfaces in the region of the connection piece for axial and radial positioning.

In addition, a seal element is provided on the filter cartridge to create a reliable seal between the untreated air space and the clean air space.

In accordance with another advantageous embodiment, the filter cartridge may be provided with a sealing system that uses synthetic resin materials of varying hardness. Thus, the sealing bead can have a very low Shore hardness of 20 to 30, for example, and the end plate made of a hard synthetic resin material can have a Shore hardness of 40 to 60, for example. A stable filter cartridge as well as a good sealing action are thus assured.

In a further embodiment, instead of a seal in the support tube, a circumferential sealing bead is provided on the side opposite from the clean air opening. The sealing bead rests against the lid or cover and forms a reliable seal between the untreated air space and the clean air space.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
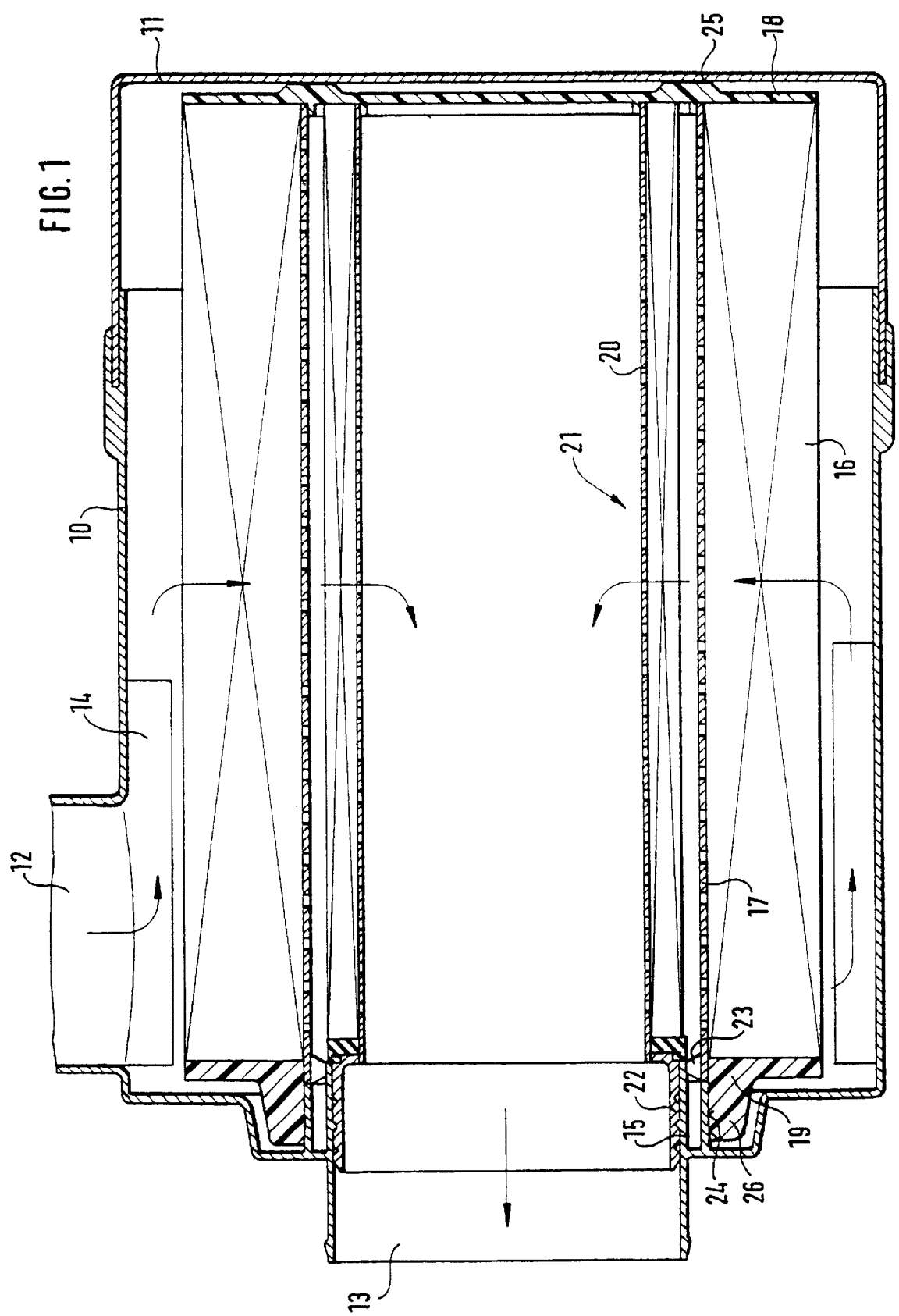
FIG. 1 is a sectional view of one embodiment of filter cartridge constructed in accordance with the present invention.

The air filter according to the sectional view of FIG. 1 comprises a filter housing 10 that is sealed by a lid or cover 11. An inlet for untreated air 12 is situated on the filter housing 10, and an outlet for clean or filtered air 13 is situated on the end face opposite from the lid 11. An axial cyclone 14 is provided on the inner circumference of the filter housing 10, and a concentric connection piece 15 located in the vicinity of the clean air outlet 13 extends inwardly into the interior of the housing.

Situated in the filter housing 10 is a filter cartridge 16 comprising a filter medium such as filter paper, for example, that is folded in a zigzag shape and arranged on a support body 17. The end faces of the filter cartridge 16 are provided with elastic or resilient end plates 18, 19. A safety filter element 21 is also situated in the housing, and likewise comprises a filter cartridge 20 or non-woven fabric and a support body that is arranged in the filtered air outlet 13 by means of attachment fittings 22.

The support body 17 of the filter cartridge 16 is provided with support surfaces 23 on the end facing toward the filtered air outlet. The support surfaces rest against the connection piece 15 at the filtered air outlet and thereby radially fix the filter cartridge 16. The support body 17 is situated axially in contact with an annular support surface 24, thereby defining the axial position of the filter cartridge. A foam interlayer may be provided, if needed. The support body 17 merges directly into the end plate 18 on the axial end of the filter cartridge facing toward the cover.

The end plate 18 also has support surfaces 25 that interact with the cover 11 and prevent axial movement of the filter cartridge. The end plate 19 is provided with a sealing collar 26 that rests against the annular support surface 24 and provides a reliable seal between the untreated air space and the filtered air space. Thus, the end plate and in particular the sealing collar 26 are not mechanically attached to the support body 17.

An advantage of this design is that the installed filter cartridge 16 does not absorb clamping forces, and only the support body 17 provides bracing for the filter cartridge. Thus, the entire filter cartridge 16 is in a force-free state. As shown by arrows in the figure, air is conducted into the untreated air inlet and flows through the filter cartridge 16 and through the safety element 21, and exits the filtered air outlet 13 in a cleaned state.

Figure 2:
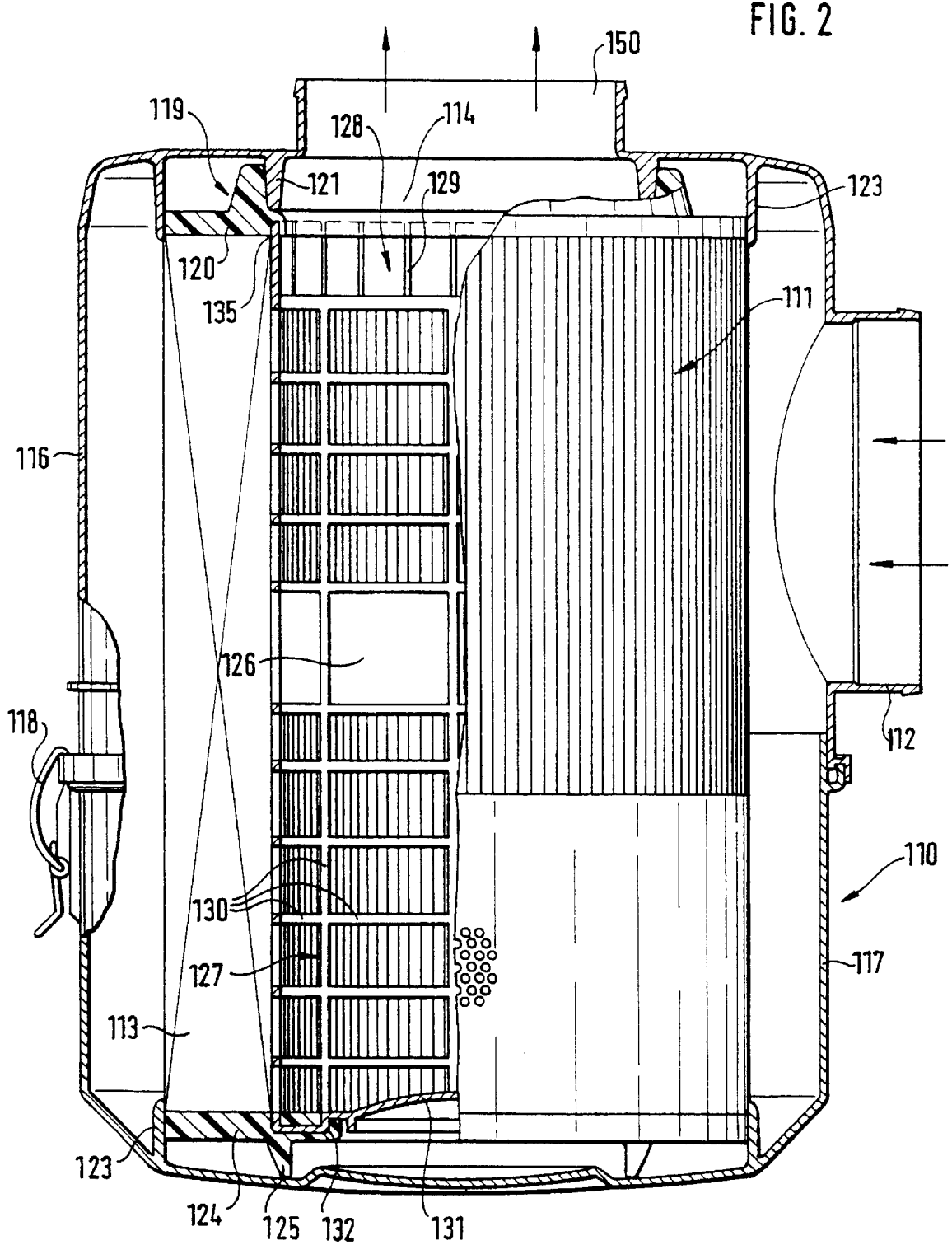
FIG. 2 is a partially cut away sectional view of a second filter cartridge embodiment constructed in accordance with the present invention.

FIG. 2 shows a filter housing 110 that has an installed air filter cartridge 111. Air enters through an untreated air inlet 112 into the filter housing, passes inwardly from the outside through a filter medium 113 of the air filter cartridge, flows to an outlet 114, and exits the filter housing through a clean air discharge 150 that is connected to the outlet 114.

The filter housing 110 comprises a housing vessel 116 and a cover 117 that are held together by a clamp or a latch 118. To install the air filter cartridge, the housing cover is removed and the filter cartridge, which has a sealing bead 119 that is part of an outlet end plate 120 of the filter cartridge, is pushed onto a tubular connection piece 121.

The clean air discharge 150 is situated inside the tubular connection piece in the base area of the housing vessel 116. The sealing bead 119 is expanded by pushing it onto the tubular connection piece 121, resulting in a sealing connection between these parts. The outlet 114 of the filter cartridge and the clean air discharge 150 of the housing are thus sealingly separated from the remaining volume of the filter housing.

Centering rings 123 which are fitted in the cover 117 and in the housing vessel 116 act on the outer sides of the outlet end plate 120 and a base plate 124 of the air filter cartridge. In addition to centering the element, the centering connection pieces also provide support during vibrational stress on the filter housing. Putting the cover 117 in place fixes the air filter cartridge 111 in the installed position. Elastic or resilient noses 125, which are foamed onto base plate 124 and rest against the inside of the cover 117, urge the air filter cartridge firmly against tubular connection piece 121 at discharge 150.

The air filter cartridge comprises a filter medium 113, in particular a filter paper that is folded in a zigzag shape (i.e., pleated), which is formed into an annulus and joined to a cylindrical jacket of the air filter cartridge. The axial end faces of the filter medium are cast into the base plate 124 and the outlet end plate 120. A support tube 127 is situated in the cylindrical interior 126 of the air filter cartridge.

The end of the support tube on the outlet side has an elastic zone 128 formed by axial slits 129 in the end of the tube. The end of the support tube 127 is made elastic in the radial direction by means of the elastic zone. Since the end of the support tube is cast into the cover plate 120, the tube end expands along with the cover plate onto the tubular connection piece 121 during installation of the air filter cartridge 111, thereby forming a friction-locked connection 135 between the support tube and the cover plate.

The support tube comprises a cylindrical lattice 130 which disturbs the air flow only negligibly and assures sufficient radial support of the filter medium 113 toward the interior 126 of the filter cartridge. A dome-shaped cover 131 is injection-molded onto the end of the support tube that faces away from the outlet 114. Cover 131 has a convex shape in order to resist not only the pressure difference between the interior space 126 and the interior of the housing, but also pulsation. The lower tube end and an edge 132 of the cover 131 are cast together into the base plate 124, thereby creating a seal in this region.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter cartridge for installation in an air filter having a housing for holding the filter cartridge with an inlet for untreated air and an outlet for filtered air; said filter cartridge comprising an annular filter medium, end plates on axial end faces of said annular filter medium, and seal elements on said end plates; wherein a support body is provided interiorly adjacent said filter medium, and said support body is provided with an axial support surface that abuts an axial surface of the housing for axial positioning of the cartridge and a radial support surface that abuts a radial surface of the housing for radial positioning of the cartridge at the end of the filter cartridge that faces the clean air outlet of the housing when the cartridge is installed in the housing; and wherein a radial surface of the seal element on the end plate of the filter cartridge that faces the clean air outlet when the cartridge is installed in the housing rests against an annular support surface, wherein the filter medium is not axially compressed.

2. A filter cartridge according to claim 1, wherein said filter cartridge is an air filter for an internal combustion engine.

3. A filter cartridge according to claim 1, wherein said filter medium is a pleated filter paper.

4. A filter cartridge according to claim 1, wherein the seal element forms a one-piece structural unit with the axial end plate.

5. A filter cartridge according to claim 1, wherein the filter cartridge is supported axially by a housing wall or cover at the end remote from the filtered air outlet of the housing when the filter cartridge is installed in the housing.

6. A filter cartridge according to claim 5, wherein the filter cartridge is directly supported axially by the support body.

7. A filter cartridge according to claim 5, wherein the filter cartridge is supported axially indirectly through the support body.

8. A filter assembly comprising a filter housing having an inlet for untreated air, an outlet for filtered air and a filter cartridge according to claim 1 interposed between said inlet and said outlet; said filter assembly further comprising an axial cyclone interposed between the untreated air inlet of the housing and the filter cartridge for imparting a swirling motion to air passing from said inlet to said filter cartridge.

9. A filter cartridge according to claim 1, wherein the seal element has a lower Shore hardness than the axial end plate on which the seal element is disposed.

10. A filter cartridge according to claim 1, wherein the seal element on the axial end plate facing the filtered air outlet when the filter cartridge is installed in the housing is an axially extending, circumferential, resilient nose and creates a seal between an untreated air space and a filtered air space when the filter cartridge is installed.

11. A filter cartridge according to claim 1, wherein the axial end plate which faces the filtered air outlet when the filter cartridge is installed in the housing forms a structural unit with the support surfaces.

12. A filter assembly comprising a filter housing and a filter cartridge according to claim 1 disposed in said housing, wherein the filter housing comprises a housing vessel having an inlet for untreated air and an outlet for filtered air, a cover and a latch for securing the cover to the housing vessel to form a closed housing chamber, the filtered air outlet has a tubular connection piece that projects into the housing chamber, one axial end plate of the filter cartridge is sealingly supported on said tubular connection piece, and the other axial end plate of the filter cartridge is supported in said cover.

13. A filter cartridge comprising a cylindrical air filter element comprised of an annular filter medium, a base plate, a deformable axial end plate having an outlet for filtered air, and a support tube integrated into the filter cartridge, said support tube forming a friction-locked connection with the axial end plate with the outlet and having an elastic zone at the end of the support tube adjacent said friction-locked connection.

14. A filter cartridge according to claim 13, wherein said annular filter medium comprises a pleated filter paper formed into a hollow cylinder.

15. A filter assembly comprising a filter housing with an inlet for untreated air and an outlet for filtered air, and a substantially cylindrical filter cartridge arranged in said housing between said inlet and said outlet, wherein said filter cartridge is mounted on a connection piece at the filtered air outlet and has an internal support body provided with a radial support surface abutting a radial surface of said connection piece for radially positioning the filter cartridge and with an axial support surface abutting an axial surface of the housing for axially positioning the filter cartridge, and wherein a seal element having a radial surface abutting an annular support surface of the housing for sealing of the filter cartridge to the housing, wherein the filter medium is not axially compressed.

* * * * *